(No Model.)

E. W. RICE, Jr.
ROTARY CONVERTER.

No. 583,944.                    Patented June 8, 1897.

WITNESSES:
A. H. Abell.
B. B. Hull.

INVENTOR.
Edwin W. Rice, Jr.
Geo. B. Blodgett,
atty

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

ROTARY CONVERTER.

SPECIFICATION forming part of Letters Patent No. 583,944, dated June 8, 1897.

Application filed March 14, 1896. Serial No. 583,168. (No model.)

*To all whom it may concern:*

Be it known that I, EDWIN W. RICE, Jr., a citizen of the United States, residing at Schenectady, in the county of Schenectady, State of New York, have invented certain new and useful Improvements in Rotary Converters, (Case No. 369,) of which the following is a specification.

My invention relates to dynamo-electric machines, especially to such machines when used as rotary converters of the polyphase or single-phase type, by means of which alternating currents are converted into continuous, or vice versa, the outgoing currents being then utilized for any purpose to which they may be applicable.

The invention is in part applicable to dynamo-electric machines of any type.

It has for its object to balance the armatures of such apparatus, using the term in its electrical sense, so that their action is improved and the commutation is effected with more facility.

To accomplish the ends pointed out, I preferably use a single-wound armature of the now well-known "Bradley" type. This may be either a ring or drum winding without affecting my invention. I have shown it in the accompanying drawings as a ring-winding, but this is an immaterial feature. The armature is provided upon one side with a commutator of a suitable number of segments for the winding chosen, and upon the other side with collector-rings for the alternating current. The collector-rings are connected to suitable points in the winding, in the case of three-phase machines, at one hundred and twenty degrees apart. In a two-phase apparatus they would of course be ninety degrees apart. To obtain the improved balancing to which I have referred, I also connect all of the equipotential points around the armature, either by leads passing from one point to another, one of such leads being connected to the collecting-ring, or I connect each of the equipotential points to the collecting-ring by a separate lead, the collecting-ring thus becoming an equalizer. It is of course intended, in speaking of the angular difference of position of the connected points, to refer to the polar pitch of the machines—that is to say, each cycle being taken at three hundred and sixty degrees.

Figure 1:
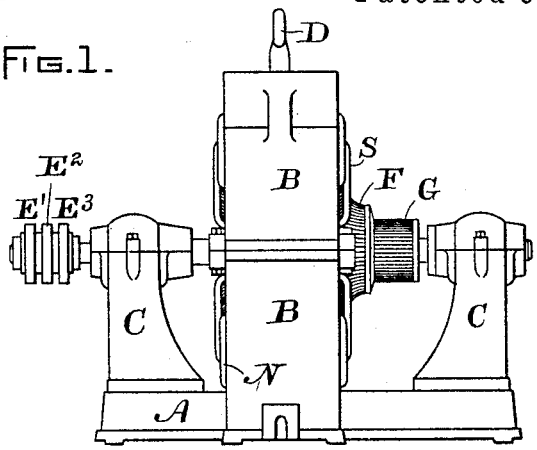
Figure 2:
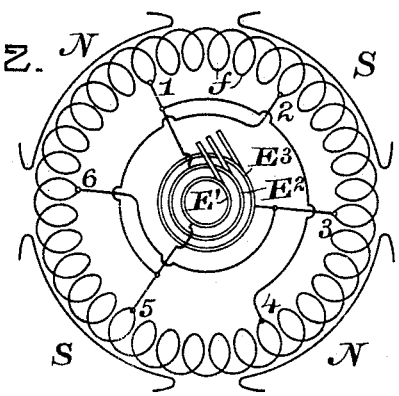
Figure 3:
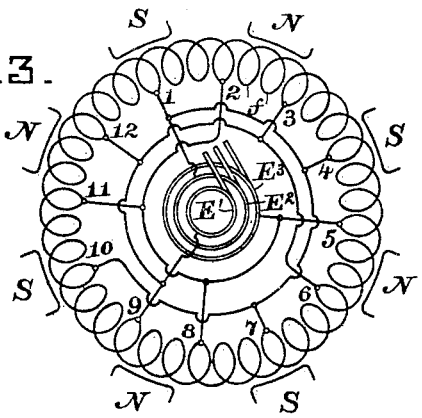

The accompanying drawings show my invention, Figure 1 being a side elevation of my improved converter, and Figs. 2 and 3 being explanatory diagrams of the connections, Fig. 2 showing the invention applied to a four-pole machine, and Fig. 3 to one of eight poles.

A is the base of the machine.

B B are the parts of the field-magnet frame.

C C are the pedestals.

D is the usual lifting-ring applied to the upper part of the field-magnet.

$E'$ $E^2$ $E^3$ are the collecting-rings.

F is the armature, and G is the commutator.

No special feature of novelty is embraced in the mechanical construction of the machine.

Referring to Fig. 2, I show how the equipotential parts of the armature are connected. I have illustrated, as will be apparent, a three-phase machine having four poles N S, &c. The number of points in the armature-winding tapped is the number of phases into the number of pairs of poles. In the case illustrated there would be of course six points at which the armature-winding would be connected according to my invention. These points are numbered consecutively 1 to 6 around the armature-winding $f$, and two of them would be connected to each of the collector-rings. The points 1 and 4 are connected to the ring $E^2$, points 2 and 5 to the ring $E'$, and points 3 and 6 to the ring $E^3$.

Referring now to Fig. 3, I show the application of the invention to an eight-pole machine, using also the three-phase construction. In this there would be four pairs of pole-pieces and three phases, and consequently there would be twelve points around the commutator. Points 1, 4, 7, and 10 are connected to the ring $E^2$, 2, 5, 8, and 11 to the ring $E^3$, and 3, 6, 9, and 12 to the ring $E'$.

In the case of converters of different numbers of poles the same principle may be easily applied, various numbers of points of the winding being interconnected, according to the number of poles and number of phases, as already pointed out.

What I claim as new, and desire to secure by Letters Patent of the United States, is—

1. An armature for dynamo-electric apparatus of the alternating-current type, comprising a winding and collecting rings, each collecting-ring connected to leads equally spaced around the armature-winding and connecting equipotential points of each phase to one of the collecting-rings.

2. A rotary converter comprising an armature and surrounding field-poles, the armature-winding connected upon one side to a commutator, and upon the other side to collecting-rings, the equipotential points of the armature-winding for each phase being connected to a collecting-ring.

In witness whereof I have hereunto set my hand this 11th day of March, 1896.

EDWIN W. RICE, Jr.

Witnesses:
 B. B. HULL,
 A. F. MACDONALD.